H. ENGEL.
ELECTRICAL BATTERY HOLDER.
APPLICATION FILED MAR. 10, 1909.
950,845.
Patented Mar. 1, 1910.
2 SHEETS—SHEET 1.
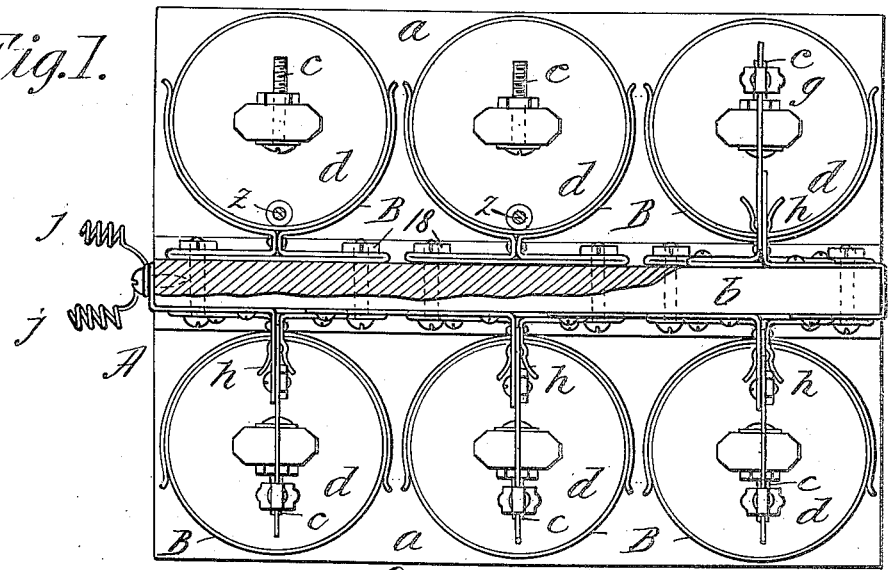
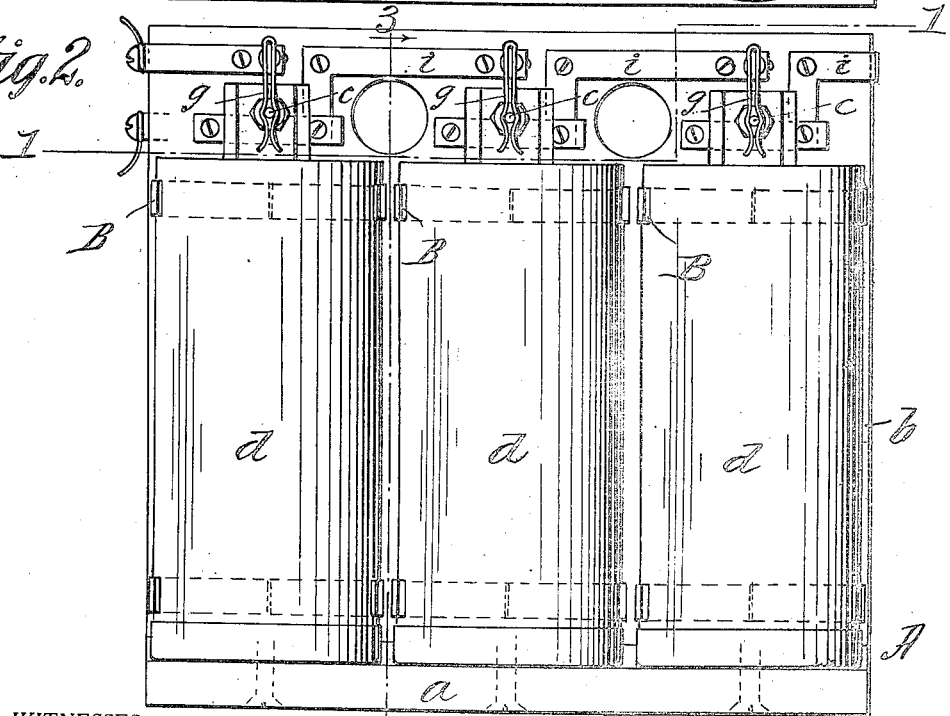
WITNESSES:
INVENTOR.
Henry Engel.
BY
ATTORNEY.

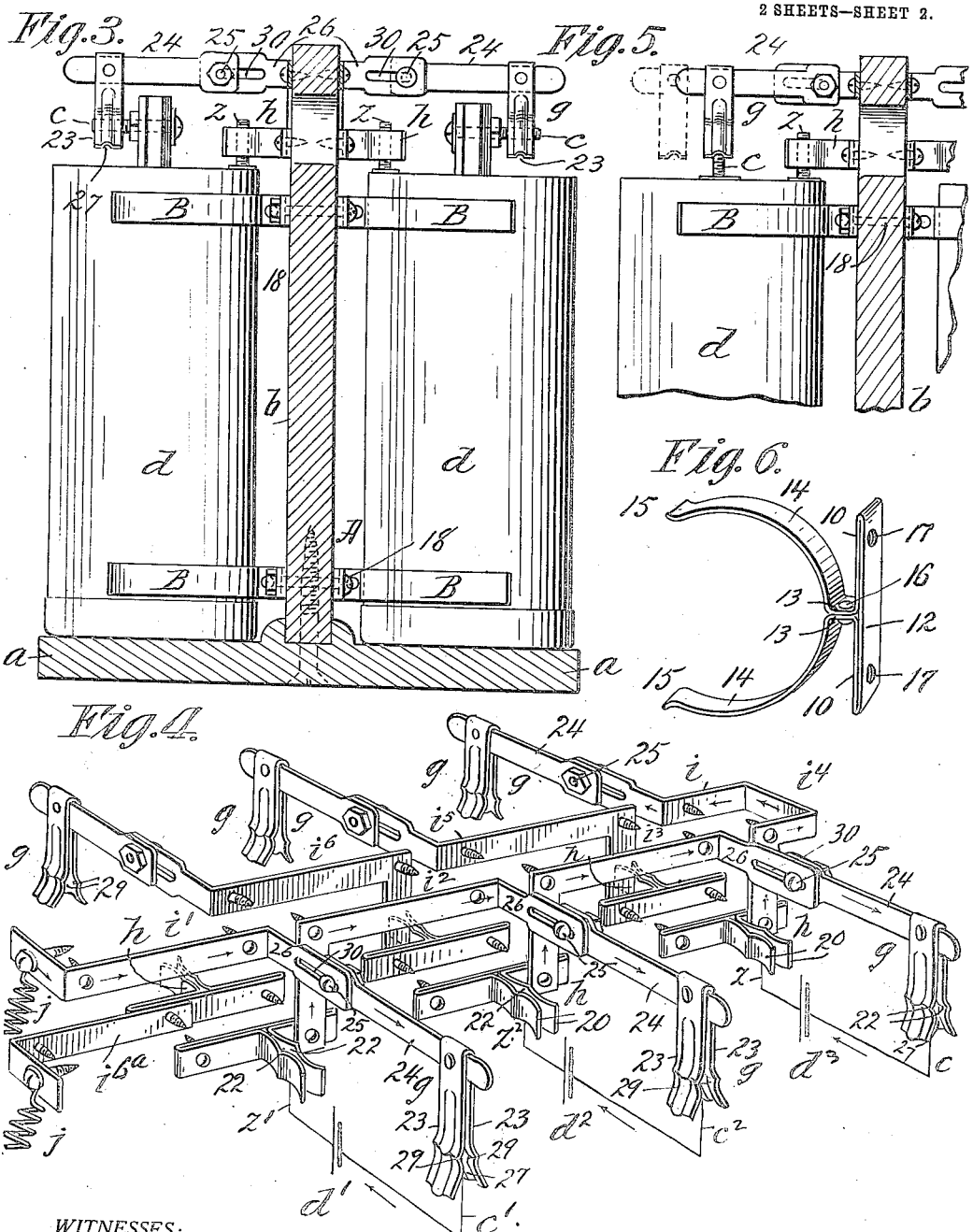

UNITED STATES PATENT OFFICE.

HENRY ENGEL, OF HOLYOKE, MASSACHUSETTS.

ELECTRICAL-BATTERY HOLDER.

950,845.                Specification of Letters Patent.        Patented Mar. 1, 1910.

Application filed March 10, 1909. Serial No. 482,486.

*To all whom it may concern:*

Be it known that I, HENRY ENGEL, a citizen of the United States of America, and resident of Holyoke, in the county of Hampden and State of Massachusetts, have invented certain new and useful Improvements in Electrical-Battery Holders, of which the following is a full, clear, and exact description.

This invention relates to a holder for supporting and retaining, against displacement, a series of electric batteries such as are especially commonly employed on automobiles in conjunction with the igniting apparatus of the gasolene engine, and such as are also extensively employed in many other situations.

An object of the invention is to provide a battery holder on and in engagement with which the batteries may be individually and severally placed and removed most easily and quickly.

Another object is to provide a battery holder of such character and capabilities that when the batteries are detachably engaged on the holder they are also individually brought into electrical connection with circuit conductors for connecting them in series, there being no necessity for wiring from one battery to another or of manipulating any binding screws or like devices.

Other objects are to render the devices comprised in the battery holder adjustable and detachable to batteries of somewhat different characters as regards the arrangement of their poles or terminals, and to render the device susceptible of simple and inexpensive construction.

The invention consists in a battery holder comprising parts and devices in arrangements and having constructions as hereinafter described in conjunction with the accompanying drawings and set forth in the claims.

My present battery holder is illustrated in the accompanying drawings in which:—

Figure 1 is a plan view showing the same as comprising retainers and electrical connections for six batteries, a middle upper part of the holder being represented in section on line 1—1, Fig. 2, which latter is a front elevation. Fig. 3 is a sectional elevation as seen transversely of the device, the portion in section being on the plane indicated by line 3—3, Fig. 2; Fig. 4 is a perspective view representing the arrangement of the metallic devices for electrically connecting the series of batteries when brought to engagement with such devices; Fig. 5 is a partial sectional elevation somewhat similar to Fig. 4, but for the purpose of indicating the availability of this device in conjunction with batteries in which the poles or terminal extensions have a different arrangement from that shown in Figs. 1 to 3. Fig. 6 is a perspective view of one of the clips or spring retainers, a series of which are comprised in the holder.

Similar characters of reference indicate corresponding parts in all of the views.

While this battery holder, which is preferably portable, is susceptible of considerable variation as to design and matters of minor importance, I will proceed to describe the same, in connection with the drawings, in detail, although, of course, alterations and an enlargement or lessening of the scope of the device may be made without departing from the gist of my invention.

In the drawings:—A represents a stand comprised in the holder which consists of a base *a* and an upright *b* rising from the middle portion of the base, so that the base provides a foot-support or rest for batteries *d d d* at the opposite sides of the upright.

B B represent partially circular spring clips, supported in side by side arrangements on and extending outwardly from the face of the upright and having regular spacings corresponding to the distances between the centers of the batteries,—the usually cylindrical bodies of which latter are constrictively engaged and detachably held by the clips. These clips are preferably provided in upper and lower series on both sides of the stand whereby there is a pair of the clips for engaging each battery at different portions in the height thereof as clearly represented in Figs. 2 and 3.

The spring clips are constituted, advantageously, of a single length of flat spring metal having portions 10, 10 at either side of its middle portion 12 return bent on said middle portion, having portions 13, 13, thereof which are farther toward its ends, outwardly turned at right angles to the superimposed portion 10, 10, and 12, and in contact with each other and having its extremities 14, 14, oppositely curved to constitute a partially circular constrictive yoke,—the outer ends 15 being outwardly deflected; and a rivet 16 secures the contacting outwardly turned portions 13, 13, of the clip in their close relations,—all as particularly shown in Fig. 6. The back or attachment portion of each clip has screw holes 17, 17, through which, by means of headed screws or bolts 18 the clips are secured on the upright.

The clips are made to embrace a little more than one-half of the circumference of the batteries; and it is, of course, apparent that the batteries may individually be easily crowded to place on the holder and there reliably retained and also as easily withdrawn, as occasion may require by a sufficient intelligently applied force manually exerted.

In this device the act of positioning a battery and securing the detachable engagement thereof on the holder also brings one of the poles or terminals $z$ into engagement with a member $h$ of a metallic connection plate $i$ while the other pole or terminal C assumes a position to be engaged by a member $g$ of another metallic connection plate $i$ insulated from the one to which the arm or member $h$ is an appurtenance. Each connection plate $i$, however, carries or is provided with members $h$ and $g$, one of which has its location over, and for detachable engagement with, one pole of a given battery while the other arm of such pair has its arrangement over, and for detachable engagement with, the opposite pole of an adjacent battery,—that is while the one arm of one plate engages, or is engaged by the pole or terminal $z$ of the zinc element of one battery, the other extension or arm of the same plate has a position to be engaged by, or to be readily brought into engagement with the pole or terminal $c$ of the carbon element of an adjacent battery.

Referring to Fig. 4 and noting that $z'$ and $c'$ indicate, diagrammatically, the poles of a battery, the location of which is indicated by $d'$, it will be perceived that it is the member $g$ of plate $i$ the location of which is, for the purposes of this description, especially indicated by $i'$, which engages the pole $c'$ of battery located at $d'$ while the arm or extension $h$ which engages the pole $z'$ of the same battery, at $d'$, is made as a part or continuation of the plate, the special location of which is indicated by $i^2$,—every one of the plates being separate and insulated from another. The battery at $d'$ may be regarded as first, or one end $l$ of the series, and its poles are connected by the arm $g$ of the plate at $i'$ and the arm $h$ of the plate at $i^2$; the next battery having its location as indicated at $d^2$ at its pole $c$ connected with arm $g$ of the plate located at $i^2$ while its pole $z$ is connected with the arm $h$ formed as one with the connection plate having the location at $i^3$; and so on, in progression, the arms of the respective plate $i^4$, $i^5$ and $i^6$ engage the opposite poles of succeeding batteries and connect them for electrical purposes in the same manner as has heretofore usually been done by wires in comparatively short length running from zinc to carbon, and carbon to zinc battery poles and thereat connected with binding screw arrangements.

$j$ $j$ represent the electric wires running from the plate at $i$ and a last connection plate $i^{6a}$ at the farther end of the series therefrom for the making of an electric circuit in which the battery series is comprised. Each arm $h$ of any of the plates of the series characterized by the letter $i$ is made in the form of paired, and contacting or adjacent spring fingers 20, 20 horizontally extended from the face of the plate as a part of which it is formed or with which it is connected, its extremities being turned outwardly away from each other and it is preferably made with opposed vertical channels 22, 22, as shown in Fig. 4 to receive therein under more or less spring pressure the upstanding metallic battery terminal $z$.

The arm $g$ is made as depending spring fingers 23, 23, carried at the outer end of a horizontal bar or arm section 24 which is hinge connected as shown at 25 to an extension section 26 of the connection plate $i$. The opposed members 23, 23, of the depending portion of the arm $g$ have vertical channels 27 in their proximate faces which endwise open downwardly to the outwardly turned ends of the paired members 23, 23, and they also have transverse channels 29, 29, in their proximate faces above their lower ends so that when the battery is brought to place and into engagement by its pole extension $z$ with the arm $h$ appurtenant the one plate $i$, the arm $g$ of another plate having its location centrally and horizontally over a given arm $h$ may be swung from an elevated position (in which it had been placed preparatory to bringing a battery to its position on the holder,) to its position represented in the drawings for engaging, as particularly shown in Figs. 2 and 3, the horizontally disposed terminal $c$ of the carbon element of the battery, or as represented in Fig. 5, the vertically disposed battery terminal $c$, accordingly as one or the other construction of batteries are to be mounted and electrically connected on the holder. And inasmuch as some of the terminals $c$ are truly axial of the one kind of battery, and offset from the axis in another kind of battery, to adapt this holder for utilization equally well with either form, the horizontal bar-like member of arm $g$ is made with a slot 30 in one of its sections 26 so that the other, though the medium of the bolt which constitutes its hinge 25, may have an adjustment inwardly toward, or outwardly from the face of the upright as occasion may require.

I claim:

1. In a device of the character described, a stand comprising means for supporting and detachably confining a plurality of batteries in side by side arrangement and provided at an upper portion thereof with pairs of metallically connected outwardly extended metallic arms, an arm of each pair being comparatively short and having its location over and for detachable engagement with one pole of a given battery while the other arm of such pair is of greater length and has its location at a higher level than that of the first arm, and has means for engaging with the opposite pole of another battery.

2. In a device of the character described, a stand comprising means for supporting, and detachably confining thereon, a plurality of batteries in side by side arrangement and provided at an upper portion thereof with insulated pairs of metallically-connected metallic arms, an arm of each pair being comparatively short and having its location over and for engagement with one pole of a given battery while the other arm of such pair is longer, has a higher location, is provided with a depending extension, and has its arrangement over and for engagement with a pole of another battery.

3. In a device of the character described, a stand having means for supporting, and detachably confining thereon, a plurality of batteries in side by side arrangement and provided at an upper portion thereof with insulated pairs of electrically-connected metallic arms, an arm of each pair being comparatively short, comprising separable and constrictive spring members, and having its location over and for engagement with one pole of a given battery, while the other arm of such pair is longer, has a higher location, is provided with a depending extension, also comprising separable and constrictive spring members, and has its arrangement over and for engagement with a pole of another battery.

4. In a device of the character described, a stand comprising means for supporting and detachably confining a plurality of batteries in side by side arrangement and provided at an upper portion thereof with insulated pairs of metallically-connected metallic arms, an arm of each pair being comparatively short and having its location over and for engagement with one pole of a given battery while the other arm of such pair is longer, has a hinge-connected extremity, has a higher location, is provided with a depending extension, and has its arrangement over and for engagement with a pole of a battery different from the one the pole of which is engaged by the first named arm.

5. In a device of the character described, a stand comprising means for supporting and retaining a plurality of batteries in side by side arrangement and provided at an upper portion thereof with pairs of metallically connected metallic arms, an arm of each bar having its location over and for engagement with one pole of a given battery while the other arm of the bar has its arrangement over and for engagement with a pole of another battery, each said arm comprising separable constrictive spring members having vertical channels in their proximate faces.

6. In a device of the character described, a stand comprising means for supporting and retaining a plurality of batteries in side by side arrangement and provided at an upper portion thereof with pairs of metallically connected metallic arms, an arm of each bar having its location over and for engagement with one pole of a given battery while the other arm of the bar has its arrangement over and for engagement with a pole of another battery, each said arm comprising separable constrictive spring members having vertical channels in their proximate faces, and the spring members of one of said arms having also a horizontal channel in its proximate faces.

7. In a device of the character described, a stand comprising means for supporting and detachably confining thereon a plurality of sidewise arranged batteries and provided at an upper portion thereof with insulated plates each having in metallic connection therewith a forwardly extending arm comprising comparatively short constrictive spring members, and another arm which is longer, located at a higher level and comprising a hinged connected and also a horizontally distensible section and provided with depending constrictive separable spring members, the spring members of the respective arms having their locations one over one pole of a given battery and the other over the opposite pole of another battery, the several pairs of arms being arranged in series with the short arm of one pair under the longer arm of the next pair, for the purpose set forth.

Signed by me at Springfield, Mass., in presence of two subscribing witnesses.

HENRY ENGEL.

Witnesses:
WM. S. BELLOWS,
G. R. DRISCOLL.